TWO CHANNEL VARIABLE CABLE EQUALIZER HAVING PASSIVE AMPLITUDE EQUALIZATION MEANS IN ONLY ONE OF THE CHANNELS

Filed April 15, 1965

INVENTORS
ALEXIS A. KWARTIROFF
MICHAEL F. TCHINNIS
BY Beal and Jones
ATTORNEYS

United States Patent Office 3,336,540

Patented Aug. 15, 1967

3,336,540

TWO CHANNEL VARIABLE CABLE EQUALIZER HAVING PASSIVE AMPLITUDE EQUALIZATION MEANS IN ONLY ONE OF THE CHANNELS

Alexis A. Kwartiroff, Sea Cliff, and Michael F. Tchinnis, Amityville, N.Y., assignors, by mesne assignments, to Giannini Scientific Corporation, Amityville, N.Y., a corporation of Delaware Filed Apr. 15, 1965, Ser. No. 448,528

13 Claims. (Cl. 333—28)

This invention relates to electronic equalization of transmission lines and, more particularly, to equalization systems which are capable of compensating for losses occurring during transmission of video signals over cables of various lengths.

In the transmission of complex waveform signals, and particularly of signals having high frequency components, undesirably large losses occur by reason of the inherent characteristics of transmission cables, these losses increasing with higher fequency signals. The amount of attenuation, or amplitude loss, of such signals depends on the frequencies being carried since the losses are usually due to capacitive and inductive effects; thus the attenuation at one frequency may differ considerably from that at another frequency. Additional losses in the signals result from manufacturing variations in the cables and from reflection and interaction losses due to the impedance terminations of the cables. Since the attenuation in such cable transmission systems is frequency dependent, it becomes necessary to provide compensation means for the particular frequencies which are being attenuated in order to reproduce the input frequency vs. amplitude characteristic at the cable output. Such compensation is normally provided by equalizer networks are capable of producing a videto output signal which is corrected for certain losses. However, the known equalization networks are extremely complex, of large size and undesirably heavy. Further, these equalization networks are unduly limited in their bandwidth response within the range of video frequencies. Prior art equalization networks, which are completely passive, must be carefully designed for each application so as to provide the required impedance match with the line into which they are to be inserted and to provide the required amount of equalization. These systems are not adjustable, but provide only fixed equalization, thus requiring cascading of a number of fixed equalization stages for a particular application in order to provide the desired output.

According to the present invention, there is provided a completely electronic, solid state, active, adjustable equalization system which is physically compact and suitable for employment in video cable transmission systems. Further, the equalizer permits correction to be made for the loss characteristics of a video transmission system having any one of a variety of incremental lengths of cable, permitting the necessary corrections to be made on a continuous basis.

More particularly, the variable cable equalizer of this invention utilizes the linear combination of the outputs from an active network having a flat amplitude vs. frequency characteristic with an active network that is equalized for high frequency losses. The variable cable equalizer employs an adjustment for the relative contribution of the two active networks to the resultant output signal, thus providing adjustable equalization to any point between and including the degree of equalization achieveable by either of these active networks, i.e., between the zero equalization of the one network and the maximum equalization of the other network.

It is, therefore, an object of this invention to provide a variable equalizer system which is relatively simple in circuit arrangement and which provides increased reliability and operating life.

Another object of this invention is to provide means for equalizing various incremental lengths of transmission cable without requiring that a plurality of stages be cascaded.

An additional object of the invention is to provide a continuously variable equalizer capable of performing equalization for variable lengths of transmission lines and which does not present the problems of reflection and interaction losses due to differences between amplifiers and equalizers such as are encountered in cascading a plurality of fixed networks.

An additional object of the invention is to provide an equalizer system utilizing a combination of active and passive networks which is adapted for use with varying incremental lengths of transmission cable and which is capable of providing any desired amount of equalization.

An additional object of the invention is to provide a continuously variable equalization system having two parallel-connected channels, one channel providing amplification of the signal to be corrected and the other channel providing amplification and a fixed amount of equalization of this same signal. The outputs of the two channels are then variably added to provide the desired degree of equalization.

Further objects and advantages of the invention will be appreciated from the following detailed description of a preferred embodiment of the invention, selected for purposes of illustration and shown in the accompanying drawings, in which.

Figure 1:
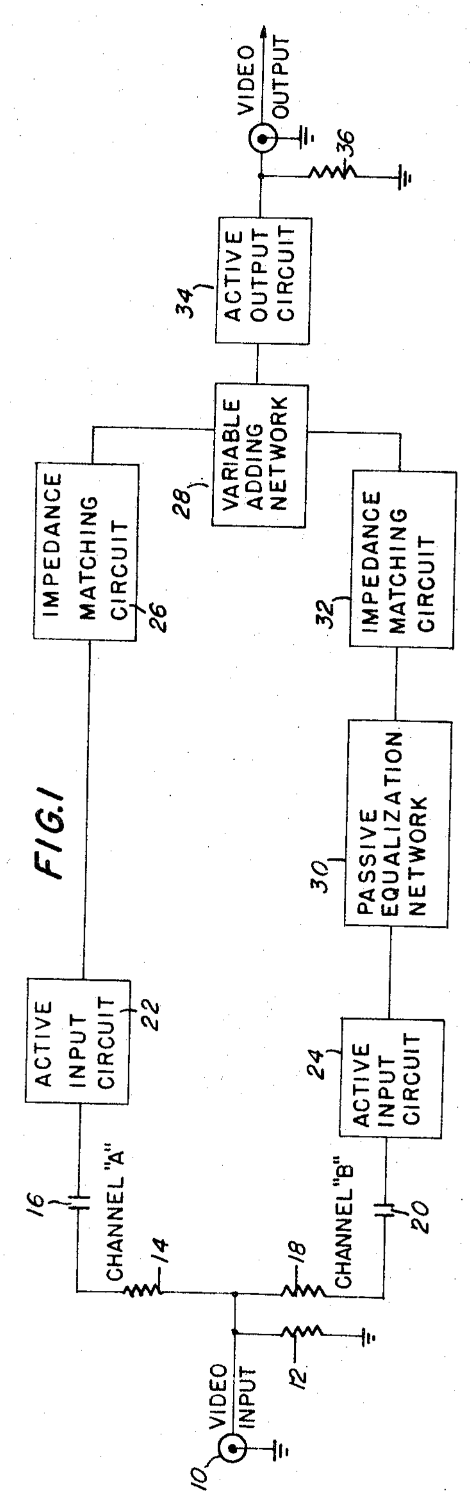
FIG. 1 is a block diagram of a variable cable equalization system arranged in accordance with the present invention.

Turning now to the block diagram of FIG. 1, there is provided on transmission line 10 a video input signal having amplitude vs. frequency characteristics which are to be corrected by the variable cable equalizer. This input signal is applied across resistor 12 to channels A and B of the equalizer system. The video input signal is applied through resistor 14 and capacitor 16 to the active-stage input circuit 22 and, simultaneously, through resistor 18 and capacitor 20 to active-stage input circuit 24.

Active input circuit 22 is a stabilized, flat-response amplifier having a frequency response which is equal to, or greater than, the highest frequency for which equalization is required. Amplifier 22, which is shown is schematic form in FIG. 2, has a flat amplitude vs. frequency characteristic and thus amplifies all frequencies within its band width capabilities an equal amount. Thus, the output signal from amplifier 22 has the same amplitude vs. frequency characteristic as the input signal, the difference between the input and output signals being the absolute magnitude which is modified by the gain of the active input circuit. This unequalized output signal is applied to an active impedance matching circuit 26 which provides both isolation and impedance matching between the active input circuit 22 and a variable adding network 28.

Figures 2, 3, 4, 5:
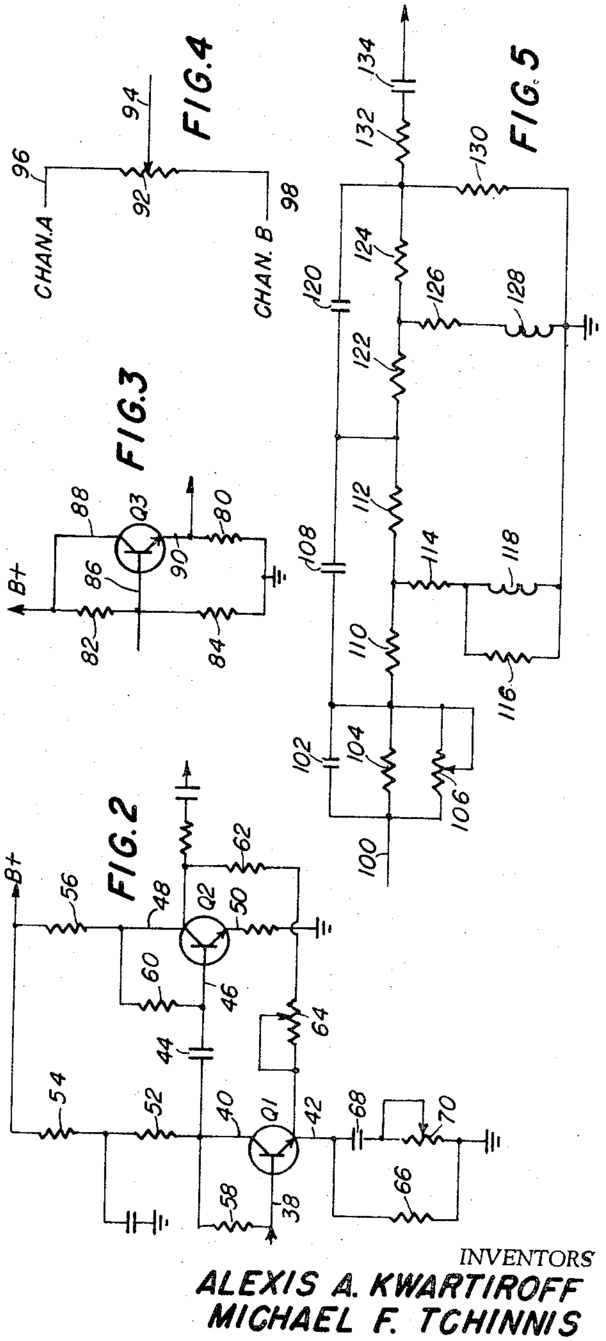
FIG. 2 is a schematic diagram of a two-stage feedback amplifier such as may be used in the system of FIG. 1.
FIG. 3 is a schematic diagram of an impedance matching circuit such as may be used in the system of FIG. 1.
FIG. 4 illustrates a suitable adding network.
FIG. 5 is a schematic diagram of a passive equalization network suitable for use in the system of FIG. 1.

Active input circuit 24 in channel B is also a stablized amplifier such as that illustrated in FIG. 2, the amplifier having a flat amplitude vs. frequency characteristic and having a frequency response that is equal to, or greater than, the highest frequency for which equalization is required. The output of amplifier 24 has the same amplitude vs. frequency characteristics as the input, with the absolute magnitude of the signal being modified by the gain of the active input circuit. This output signal is applied to a conventional passive equalization network 30 which is designed to provide a fixed equalization of the maximum magnitude that may be required in any application of the system. An example of a passive equalization network suitable for use in this system is illustrated in FIG. 5. This maximum equalized signal is then applied to an active impedance matching circuit 32 which provides both isolation and impedance matching between the passive equalization network 30 and the variable adding network 28.

The unequalized and the maximum equalized signals from channels A and B, respectively, are simultaneously applied to the variable adding circuit 28. As illustrated in FIG. 4, adding network 28 may be a linear adding potentiometer. Adjustment of the movable arm of the linear adding potentiometer provides an output signal which is equalized to any desired degree between zero equalization, where the output is entirely from channel A, and maximum equalization, where the movable arm of the potentiometer is set for the full equalize signal from channel B. The number of equalization points available between zero and maximum equalization is limited in this system only by the resolution of the potentiometer.

The equalized signal from the variable adding network 28 is then applied to an active output circuit 34, which circuit is a stabilized, flat-response amplifier having an adjustable gain characteristic to control the overall magnitude of the output signal from the system. Active output circuit 34 is illustrated in FIG. 2 and thus is identical to the other flat-response amplifiers used in the system.

Referring now to the circuit diagram of FIG. 2, there is shown a wide-band, two-stage feedback amplifier such as may be used in the active circuits 22, 24 and 34 of the system shown in FIG. 1. The amplifier is comprised of transistors Q1 and Q2 connected in common emitter configuration and further conected in cascade in known manner, the output signal from collector 40 of Q1 being coupled to the base 46 of Q2 through a coupling capacitor 44. The video input signal is applied to base electrode 38 of Q1 and the video output signal is obtained from collector 48 of Q2. The collectors of Q1 and Q2 are connected through resistors 52, 54 and through resistor 56, respectively, to a source of positive bias voltage B+. Local D.C. feedback stabiliation is obtained through feedback resistors 58 and 60 connected between the collector and base electrode of transistors Q1 and Q2 respectively. A feedback loop is provided between the collector electrode 48 of Q2 and emitter electrode 42 of Q1 through a fixed resistor 62 and a variable resistor 64, the variable resistor providing gain control for the amplifier. Emitter 42 of Q1 is connected to ground through the parallel arrangement of a resistor 66 and series-connected capacitor 68 and potentiometer 70. This parallel circuit provides high frequency compensation for the amplifier circuit.

FIG. 3, which is the schematic diagram of impedance matching circuits 26 and 32, is a standard emitter-follower circuit made up of transistor Q3, emitter resistor 80 and input bias resistors 82 and 84. The video input signals to the impedance circuit are applied to the base 86 of Q3 and output signals are obtained from emitter 90. Collector 88 is connected to a source of bias voltage B+. A resistor may be added in series to the output of this circuit to increase its output impedance if required by the circuit design.

FIG. 4 shows a variable adding network which may be used with the present system. This network comprises a potentiometer 92 having a movable output arm 94. Input signals from channels A and B are applied to the potentiometer over input leads 96 and 98, respectively, the resultant signal appearing on movable arm 94. The exact position of the movable arm determines the proportion of the signals appearing on channels A and B which will be applied through arm 94 to the output circuit 34 (FIG. 1). Normally, and as used in the present system, it is contemplated that the potentiometer 92 will be linear, since such a configuration produces a simplified relationship betwen the signals of channels A and B. However, it will be apparent that the characteristics of addition may be changed by the use of non-linear potentiometer, and such a potentiometer may be used in this system if so desired.

FIG. 5 discloses a passive equalization network of the type that would be suitable for use in the present system. Although any known passive equalization network may be used, a modified bridge T network has been selected for illustration here. The video input signal to be equalized is applied through line 100 to the parallel arrangement of a capacitor 102, a resistor 104, and a potentiometer 106. The signal is then fed through the parallel arrangement of a capacitor 108 and series-connected resistors 110 and 112. The junction point of resistors 110 and 112 is connected through resistor 114 and the parallel arrangement of resistor 116 and inductor 118 to ground. The video signal is then passed through the parallel arrangement of a capacitor 120 and series-connected resistors 122 and 124. The junction of resistors 122 and 124 is connected through resistor 126 and inductor 128 to ground. The output of the circuit appears across resistor 130 connected between the junction of capacitor 120 and resistor 124 and ground. The output signal is applied through resistor 132 and coupling capacitor 134 to the impedance matching circuit 132 (FIG. 1).

Impedance matching between the input and output transmission lines and the equalizer system is provided by means of resistors 12, 14 and 18 at the input end and resistor 36 at the output end. The video input signal is applied through capacitors 16 and 20 to the active input circuits 22 and 24 respectively. The phase relationship between the parallel channels is automatically compensated for by the inclusion in each channel of the same member of active circuits; thus, the video signals applied through channels A and B to the variable adding network 28 are in phase.

Although the active circuits 22, 24 and 34 have been disclosed as being identical amplifier circuits, it should be noted that this need not necessarily be the case, for certain modifications in one or another of these amplifiers may be desired for a specific system application. Active circuit 24, for example, may be provided with different characteristics than those exhibited by active input circuit 22 in order to provide different equalization characteristics for channel B. However, such variations would not reflect the normal situation, but would only be used where the requirements were unusual.

Thus there has been provided an electronic equalizer which, through the use of active circuitry, is capable of providing equalization for a wide variety of applications. This system may be matched to compensate for losses occurring in various lengths of transmission lines merely by changing the percentage of equalization through adjustment of the variable network, thus providing a system which is adapted for use in varying applications and which may be quickly and easily adjusted to the particular circuit requirements. Although a specific embodiment of the invention has been illustrated, it should be understood that the scope of the invention is not limited thereto, but includes the various alternatives and modifications that fall within the true scope and spirit of the invention as defined by the following claims.

What is claimed is:

1. In a variable equalization system for transmission lines, first and second equalization channels each having an input and an output and being connected in parallel in a transmission line, said first channel including first active input means and first impedance matching means connected in series to provide zero amplitude equalization, said second channel including second active input means, and second impedance matching means connected in series, and passive amplitude equalization means connected only in said second channel, said equalization means being connected in series between said second active input means and said impedance matching means, said second channel providing maximum amplitude equalization as determined by said passive equalization means.

2. The system of claim 1, wherein each of said first and second active input means consists of a stabilized, flat-response amplifier providing impedance matching with the transmission line at the input end of said system.

3. The system of claim 1, further including means for variably combining the outputs of said first and second channels to permit adjustment of the resultant output signal to any level of amplitude equalization between the zero equalization of said first channel and the maximum equalization of said second channel, whereby the amplitude vs. frequency characteristic of a transmission line may be corrected.

4. The system of claim 3, wherein said first and second impedance matching means are active circuits.

5. The system of claim 3, wherein said means for variably combining the outputs of said first and second channel is linear.

6. The system of claim 3, wherein said means for variably combining the outputs of said first and second channels is non-linear.

7. The system of claim 3, further including an active output circuit for coupling said resultant output signal to said transmission line.

8. The system of claim 7, wherein said active output circuit is comprised of a stabilized, flat-response amplifier providing signal level adjustment and impedance matching between said means for variably combining and said transmission line.

9. A parallel-connected equalization system for transmission lines carrying video signals, comprising first and second equalization channels connected in parallel in a transmission line for compensating for amplitude losses in the video signals carried by said line, said first channel including first active input circuit means and first impedance matching circuit means connected in series to provide a first output signal having zero equalization, said second channel including second active input circuit means, passive equalization circuit means and second impedance matching circuit means connected in series to provide a second output signal having maximum equalization as determined by the characteristics of said passive equalization circuit, a variable adding network for combining said first and second output signals to produce a resultant output which may be adjusted to any level of equalization between the zero equalization of said first channel and the maximum equalization of said second channel, and active output circuit means for coupling said resultant output signal to said transmission line.

10. The system of claim 9, wherein each of said active input circuits and said active output circuit comprises a two-stage stabilized, flat-response amplifier which provides signal level adjustment and impedance matching.

11. The system of claim 10, wherein said variable adding network is comprised of a linear potentiometer connected between said first and second channels and having a movable arm, said resultant output signal appearing on said movable arm.

12. The system of claim 10, wherein said variable adding network is comprised of a non-linear potentiometer connected between said first and second channels, and having a movable arm, said resultant output signal appearing on said movable arm.

13. The system of claim 10, wherein said active input and active output circuits are comprised of solid-state devices.

References Cited

UNITED STATES PATENTS

| | | | |
|---|---|---|---|
| 1,815,241 | 7/1931 | Crisson | 333—28 X |
| 2,444,063 | 6/1948 | Pfleger | 333—28 |

OTHER REFERENCES

The Post Office Electrical Engineers Journal, A Broad-Band Variable Group Delay Equalizer, R. Hamer et al., July 1957, vol. 50 Part 2, pp. 120–123.

ELI LIEBERMAN, *Primary Examiner.*

P. L. GENSLER, *Assistant Examiner.*